March 15, 1966    I. C. WATSON ETAL    3,240,503
HOLDERS FOR TOOLS OR THE LIKE
Filed April 6, 1964
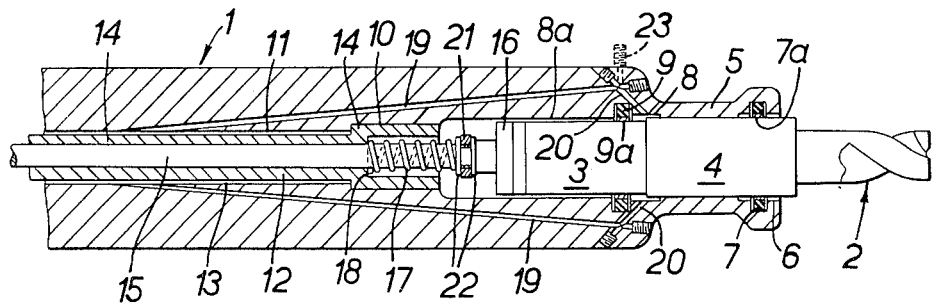
INVENTORS
Ian C. Watson
Edward G. Preston
David T. N. Williamson
By Watson, Cole, Grindle & Watson
ATTORNEYS

United States Patent Office 3,240,503
Patented Mar. 15, 1966

3,240,503
HOLDERS FOR TOOLS OR THE LIKE
Ian Courtenay Watson, Edward George Preston, and David Theodore Nelson Williamson, London, England, assignors to The Molins Organisation Limited, a corporation of Great Britain
Filed Apr. 6, 1964, Ser. No. 357,645
Claims priority, application Great Britain, Apr. 10, 1963, 14,365/63
6 Claims. (Cl. 279—4)

This invention relates to holders for tools or the like, as may be required for example to secure a drill bit in the tailstock of a lathe.

Various types of clamping device are conventionally used for holding tools or the like. The usually preferred form of holder is the chuck, which as is well known comprises a plurality of jaws (usually three or four) in a symmetrical arrangement, between which jaws the tool or the like to be held is placed, and means for moving the jaws individually or collectively in intersecting radial planes to engage and grip the tool or the like. While a conventional chuck is of great utility considerable skill may be required in its use, e.g., when a chuck is to be used to hold a circular-section workpiece of relatively soft material, problems arise in obtaining a sufficient grip without marking the workpiece. Proper tightening of the jaws on an article to be gripped may be time-consuming and the time taken may well be objectionable where for example the chuck is used on an automatic or semi-automatic machine tool as the use of such a machine tool often is uneconomic unless its utilisation is high.

It is an object of the present invention to provide an improved holder for a tool or the like, particularly although not necessarily exclusively for use with automatic or semi-automatic machine tools.

According to the invention, we provide a holder for tools or the like comprising a tubular socket shaped to receive a pilot portion of a tool shank or the like, means adapted to form a pressure-tight seal between each end of the socket and any such pilot portion inserted therein to form an annular pressure chamber, and means for injecting liquid under pressure into said chamber so as to expand said socket to permit entry of a further portion of the tool shank or the like into the socket, said further portion having a cross-section larger than that of the socket when not expanded.

In the majority of cases the tool shank or the like will be of cylindrical form, and therefore the pilot portion will be of smaller diameter than the further portion, the normal (i.e., unexpanded) diameter of the socket being less than that of said further portion but sufficiently large to permit insertion of the pilot portion; the socket is preferably of the minimum size which permits such insertion so that the annular pressure chamber has a small radial dimension.

The sealing means conveniently comprises deformable sealing rings accommodated in grooves in the socket wall in conventional manner; O-rings may be used but we prefer square-section rings with liners or polytetrafluorethylene (p.t.f.e.). While the socket may be open at each end it is preferred that one end be closed, in which case it will be appreciated that the closed end requires to be provided with a recess or chamber of length sufficient to accommodate the pilot portion of the tool shank or the like when the further portion thereof is within the socket.

Once insertion of the further portion of the tool shank or the like has been accomplished, the injection of liquid is discontinued and liquid in the pressure chamber allowed to drain out, so that the socket attempts to contract to its normal size and grips said further portion, the socket cannot return to its original dimensions, as the further portion of the tool shank or the like is larger, and hence the walls of the socket are left in tension. An interference fit is thus secured between the socket and the tool shank or the like. The tool or the like may be removed upon making a further injection of liquid.

If a holder embodying the invention is to be used to hold a moving tool, e.g., if the holder is to accommodate drill bits and to be rotated so that stationary workpieces may be drilled, then it may be desirable for a detachable connection for liquid under pressure to be provided and this can be done because the application of said liquid to the pressure chamber in the socket is only needed during the insertion or removal of a tool shank or the like and must be discontinued when insertion is complete. Where desired, however, a permanent liquid connection may be provided, e.g., the socket may be formed at one end of a spindle through which a suitable liquid passage is provided. With such a spindle, we may also fit a rod slidable within a longitudinal bore aligned with the socket; such a rod is of use in ejecting tools or the like from the socket.

In order that the invention may be well understood, we will now describe in more detail a preferred embodiment thereof, illustrated in section in the accompanying drawing.

Turning to the drawing, a tool holder is shown which is formed at one end of a spindle 1. A drill bit 2 is shown in said holder. It will be seen that the drill bit 2 has a pilot portion 3 at the free end of its shank and a further portion 4 of said shank of somewhat larger diameter than said pilot portion 3 is gripped in a socket 5 formed in the end of the spindle 1. The spindle 1 is tubular, and the socket 5 is constituted by an end portion of the bore of said spindle, the length of such socket being somewhat less than that of the larger-diameter portion 4 of the drill bit shank. Preferably a number of longitudinal grooves, e.g., four grooves (not shown) are provided in the socket. At the free end of the spindle, a short length of its bore is enlarged as indicated at 6, and within this short length the wall of the bore has an annular groove accommodating a square-section sealing ring 7 with a liner 7a of polytetrafluorethylene (p.t.f.e.) serving to make a pressure-tight seal between the socket and the drill bit 2. From the other, i.e., the inner, end of the socket 5, the spindle bore has a further enlarged portion 8 and a further sealing ring 9 and p.f.t.e. liner 9a is similarly fitted in this portion 8, a short distance from the adjoining end of the socket 5. Beyond the ring 9 the spindle bore as indicated at 8a is of a size between that of the socket 5 and that of the portion 8, to give a free sliding fit on the pilot portion 3 of the drill bit 2.

At the inner end of the portion 8, the spindle bore is reduced in diameter in two stages, providing an intermediate portion 10 leading to a main bore 11. Within the main bore 11 is fitted a sleeve 12, of external diameter smaller than the internal diameter of said main bore so that an annular-section space 13 remains around said sleeve; the sleeve 12 has a head portion 14 which is secured (e.g., by brazing) in the intermediate portion 10 of the spindle bore. Within the sleeve 12 an ejector rod 15 is slidably carried; said rod 15 has an enlarged head 16 engageable as shown with the free end of the pilot portion 3 of the drill bit 2 and a backing spring 17 which is compressible, between said head portion and a shoulder 18 within the sleeve 12.

Drillings 19, 20 in the spindle provide liquid connections between the space 13 around sleeve 12 and the end of spindle bore portion 8 beyond the sealing ring 9, i.e. adjacent to the inner end of the socket. A further sealing ring 21 is fitted around the rod 15, between flanges 22 on said rod, so that upon withdrawal of the rod 15 a seal may be formed at the mouth of the head portion 14 of sleeve 12.

It will be noted that the spindle 1 has a smaller external diameter over its end portion in which the socket 5 is formed. With a drill bit inserted in the socket as shown in the drawing, the socket grips the bit firmly as there is an interference fit between these parts (the socket when empty having an internal diameter suitably less than the external diameter of the larger portion 4 of the drill bit shank). If however liquid under a substantial pressure is applied through the space 13 and drillings 19, 20 the socket is forcibly expanded to release the drill bit, which is ejected by rod 15 under the influence of spring 17. Where as is preferred longitudinal grooves are provided in the socket, the liquid more readily reaches and expands all parts of the socket. Preferably oil is employed as the pressure liquid, a pressure of 9,000 pounds per square inch being suitable where, for example, the socket has walls of mild steel, one-eighth of an inch thick.

Insertion of a drill may be effected by first inserting the pilot portion 3 of its shank into the socket 5 as far as possible, i.e., until the larger shank portion 4 has passed the sealing ring 7 and encountered the shoulder at the end of the larger-bore end portion 6 of said socket, then applying oil pressure via space 13 and drillings 19, 20 as before. As the socket expands, the bit can be inserted to reach the position shown in the drawing, whereafter the application of oil pressure is discontinued and oil allowed to return along drillings 20, 19 and through space 13; the socket contracts as the oil drains away, gripping the shank of the bit as shown, and as the socket cannot return to its normal size (in view of the relative sizes of the bit shank and socket as explained above) the socket walls remain in tension and an interference fit between the socket 5 and the bit shank portion 4 is produced.

Should either of the sealing rings 7, 9 fail while a tool is gripped in the holder, the tool may still be removed; if ring 7 fails, a temporary external seal may be arranged at the open end of the socket to prevent loss of oil pressure, while if ring 9 fails it is only necessary to withdraw rod 15 until ring 21 provides a seal.

Thus will be seen that a simple but efficient holder for tools or the like is provided by the invention. Various changes or modifications in the details described are possible without departure from the scope of the invention, for example, where tools or the like of a variety of sizes are to be used, the socket may be made detachable from its spindle or other support to permit the fitting of a larger or smaller socket when required. In such a case the socket may be supplied with oil via a temporary connection as indicated in dotted lines at 23, the drilling 19 then being unnecessary. Moreover, the socket need not be of cylindrical form but may be of other shapes as necessary to fit tools or the like to be held therein. Indeed, a circular-section tool or the like may be received in a socket of non-circular (e.g., triangular) section, in which event the grip obtained for any given length of socket will be less but the effort and liquid pressure required for insertion and extraction will be reduced, as there will only be narrow areas of contact between the tool or the like and the socket and moreover the socket walls will tend to flex away from the tool or the like as liquid pressure is applied while in a socket of circular section the walls must be stretched.

The drillings 19 may be difficult to form due to their high length/diameter ratio; as an alternative arrangement drillings 20 may extend to the surface of the spindle 1 and further short drillings may also be provided from the position where drillings 19 enter the central bore direct to the spindle exterior. Then a sleeve may be fitted around the spindle, the latter being provided with a portion of reduced external diameter within the sleeve to permit communication between the drillings 20 and said further short drillings, the sleeve however seating firmly on the spindle at its ends.

We claim:

1. In a machine tool, a tool-holder comprising, in combination, a tubular member defining a socket shaped to receive a cylindrical pilot portion of an article such as a tool, means adapted to form a pressure-tight seal between each end of the socket and any such pilot portion inserted therein to form an annular pressure chamber, and means for injecting liquid under pressure into said chamber so as to expand said socket to permit entry into said socket of a further cylindrical portion of said article, said socket prior to such expansion having a diameter greater than that of said pilot portion but less than that of said further portion.

2. A holder as claimed in claim 1 in which the sealing means comprises deformable sealing rings accommodated in grooves in the socket wall.

3. A holder as claimed in claim 1 in which the tubular member defines a socket having one closed end including a further chamber of sufficient length to accommodate said pilot portion when said further portion is within the socket.

4. A holder as claimed in claim 1, including a detachable connection for liquid under pressure.

5. A holder as claimed in claim 1 including a spindle having said socket formed at one of its ends, said spindle being provided with a liquid passage serving as a permanent connection for liquid under pressure.

6. A holder as claimed in claim 1, including a spindle having a longitudinal bore therethrough, said socket being formed at one end of said spindle in alignment with said bore so that the bore serves as a permanent connection for liquid under pressure, and a rod slidable within said bore for ejecting tools and the like from said socket.

References Cited by the Examiner

UNITED STATES PATENTS

| | | |
|---|---|---|
| 409,674 | 8/1889 | Fairfield. |
| 2,840,399 | 6/1958 | Harless _____ 287—53 |
| 2,942,891 | 6/1960 | Zale _____ 269—20 |
| 2,992,479 | 7/1961 | Musser _____ 287—53 |

ROBERT C. RIORDON, *Primary Examiner.*

HAROLD V. STAHLHUTH, *Assistant Examiner.*